US011931744B2

(12) United States Patent
Belotserkovsky

(10) Patent No.: US 11,931,744 B2
(45) Date of Patent: Mar. 19, 2024

(54) INERTIA CONE CRUSHER WITH A JOURNAL PLAIN BEARING

(71) Applicant: OBSHCHESTVO S OGRANICHENNOI OTVETSTVENNOSTIU "QS-TECHNOLOGIES", St. Petersburg (RU)

(72) Inventor: Konstantin Evseevich Belotserkovsky, St. Petersburg (RU)

(73) Assignee: OOO "QS-TECHNOLOGIES", St. Petersburg (RU)

( * ) Notice: Subject to any disclaimer, the term of this patent is extended or adjusted under 35 U.S.C. 154(b) by 407 days.

(21) Appl. No.: 17/437,001

(22) PCT Filed: Mar. 23, 2020

(86) PCT No.: PCT/RU2020/000154
§ 371 (c)(1),
(2) Date: Sep. 7, 2021

(87) PCT Pub. No.: WO2020/209756
PCT Pub. Date: Oct. 15, 2020

(65) Prior Publication Data
US 2022/0176381 A1 Jun. 9, 2022

(30) Foreign Application Priority Data
Apr. 11, 2019 (RU) ................................ 2019111026

(51) Int. Cl.
*B02C 2/04* (2006.01)
*B02C 2/02* (2006.01)
*B02C 2/06* (2006.01)

(52) U.S. Cl.
CPC .................................... *B02C 2/042* (2013.01)

(58) Field of Classification Search
CPC .. B02C 2/042; B02C 2/02; B02C 2/04; B02C 2/06
See application file for complete search history.

(56) References Cited

U.S. PATENT DOCUMENTS

2012/0006923 A1* 1/2012 Belotserkovskiy ..... B02C 2/042 241/207
2018/0021785 A1* 1/2018 Belotserkovsky ........ B02C 2/04 241/215
2018/0369822 A1* 12/2018 Fredriksson ............ B02C 2/042

FOREIGN PATENT DOCUMENTS

RU 2576449 C1 3/2016
RU 2587704 C1 6/2016
(Continued)

OTHER PUBLICATIONS

Search Report in PCT/RU2020/000154, dated Jul. 16, 2020.

*Primary Examiner* — Matthew Katcoff
*Assistant Examiner* — Mohammed S. Alawadi
(74) *Attorney, Agent, or Firm* — Bardmesser Law Group

(57) ABSTRACT

Inertia cone crusher for crushing materials includes a body with an outer cone and an inner cone arranged inside, on whose drive shaft an unbalance weight is provided with the aid of a slide bushing and connected via a transmission disk coupling to a combined moving dynamic assembly comprising a counterbalance weight and a counterbalance weight slide bushing, the assembly connected to a gear transmission and a motor, and has an improved plain journal bearing. The plain bearing is installed between the flange and the counterbalance weight, bearing the load from the crusher's moving part, and includes a base ring and an upper ring, the base ring having a spherical bottom surface and its mating recess on the flange's top surface. The bearing enables the moving dynamic assembly's rotation around the
(Continued)

Figure 1:
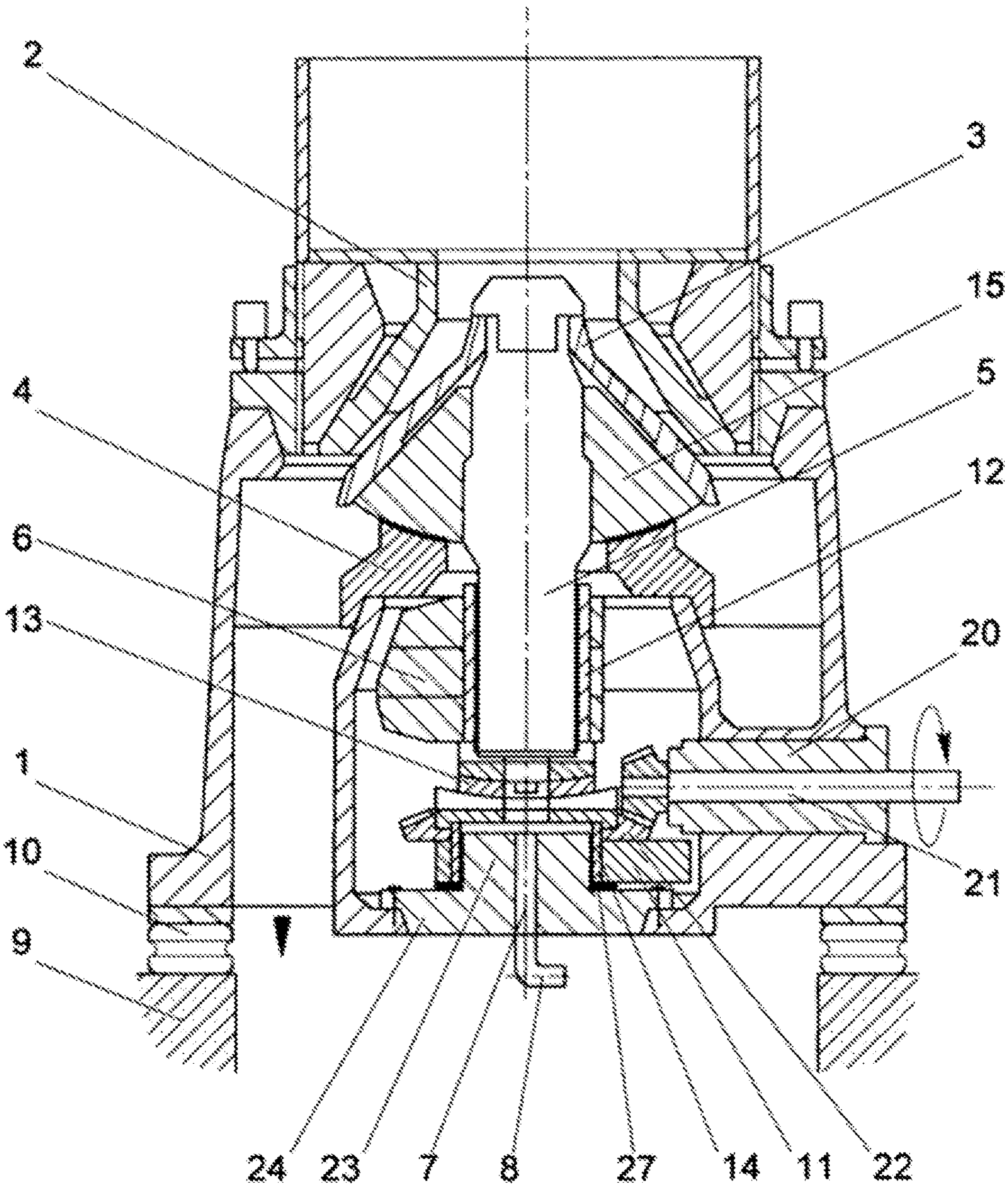

axis, using a hydrodynamic sliding mode, with radial oil slots additionally provided on top surface of the base ring.

17 Claims, 3 Drawing Sheets

(56) References Cited

FOREIGN PATENT DOCUMENTS

| | | | |
|---|---|---|---|
| SU | 1734823 | A1 | 5/1992 |
| WO | 2012005650 | A1 | 1/2012 |
| WO | 2017102022 | A1 | 6/2017 |

* cited by examiner

INERTIA CONE CRUSHER WITH A JOURNAL PLAIN BEARING

CROSS REFERENCE TO RELATED APPLICATIONS

This is a US National Phase of PCT/RU2020/000154, filed on Mar. 23, 2020, which claims priority to RU Patent Application No. 2019111026, filed on Apr. 11, 2019.

FIELD OF THE INVENTION

The invention relates to heavy mechanical engineering, to crushing and grinding equipment, and in particular to cone crushers, and may be used in industrial processes of the construction industry and mining and concentration industry.

BACKGROUND OF THE RELATED ART

It is known from conventional art that any cone crusher comprises a body with an outer cone and a crushing inner cone arranged inside it, whose surfaces facing each other form a crushing chamber. The inner crushing cone is mounted upon a cone support, for instance a spherical one, and has a drive shaft connected to a drive transmission. The drive transmission sets the inner crushing cone in motion. From the crushing chamber, the material to be crushed moves under gravity to a finished product discharge area arranged inside the body of the cone crusher. Thus, a flow of solid particles of various size is generated inevitably and continuously in the discharge area, from minute particles of dust to large parts of material to be crushed. All the moving components of the crusher operate using oil lubricants.

For dynamic balance, a counterbalance weight is added to the crusher design, or an additional unbalanced weight, which is installed opposite in phase to the unbalanced weight, and generates its own centrifugal force directed opposite the centrifugal forces of the inner cone and its unbalanced weight. The forces balance each other, which reduces the vibration loads on the crusher's components, primarily on its body.

Important features of the cone crusher design are a method and device used to transmit the torque from the motor to the unbalanced weight, in other words, the transmission assembly.

In a general case, the transmission assembly must provide the required speed of rotation, at the same time being reliable, compact, and economically feasible from the point of view of its manufacturing, installation, and maintenance.

The process parameters of an inertia cone crusher can be improved by improving the method of dynamic balancing and by upgrading the transmission assembly.

There is a known device titled "Inertia cone crusher with a modernized drive," see RU Patent No. 2587704, priority date Mar. 13, 2015.

According to that publication, the cone crusher comprises a body installed on a foundation over resilient dampers. An outer crushing cone and an inner crushing cone, which is mounted upon the head center, form a crushing chamber between them. The head center rests on the cone's spherical support. Installed on the center shaft of the head center are an unbalance weight slide bushing and an unbalance weight. The bushing is rigidly connected to a transmission coupling.

The transmission coupling consists of a driving half-coupling, a driven half-coupling, and a floating disk arranged between them.

The driving half-coupling is rigidly connected to the gear and the counterbalance weight. Simultaneously, the driving half-coupling, tooth gear, and counterbalance weight are mounted on the counterbalance weight bushing, and form one body of rotation with it.

Thus, the driving half-coupling, tooth gear, counterbalance weight, and counterbalance weight bushing form a combined moving "dynamic assembly," whose components are rigidly connected to each other.

The "dynamic assembly" is installed on a fixed pivot via a special supporting disk, enabling rotation around it. To enable rotation, the bushing is mounted on the fixed pivot, with a round recess equal to the supporting disk radius is provided on the top end of the pivot, and with a recess equal to the outer radius of the counterbalance weight's bushing provided on the driving half-coupling.

Thus, the supporting disk is arranged between the top edge of the fixed pivot and the driving half-coupling, and serves as a journal bearing for the whole "dynamic assembly."

The fixed pivot rests on a flange rigidly fixed in the body's bottom part with mounting bolts. The pivot and the flange are designed either as two different parts rigidly connected to each other or as one integral part, and serve as a fixed bearing support for the whole "dynamic assembly."

The moving "dynamic assembly" is installed so that the unbalance weight is always opposite in phase to the counterbalance weight.

From the motor, the torque is transmitted to the drive gear shaft and to the tooth gear. Together with the gear, the whole "dynamic assembly" is set in motion rotating around a fixed pivot.

The disadvantages of the above design solution are as follows.

The dynamic assembly as assembled has a significant weight, which is especially so with crushers of a medium and large size. At the same time, the dynamic assembly rotates at a high speed. As a result, the journal plain bearing bears a large mechanical and dynamic load. In the proposed invention, the journal bearing is designed as a sole supporting disk of a relatively small diameter, and therefore has a relatively small contact surface area.

The supporting disk also has a relatively small thickness. As a result of the machine's heavy duty operation, under high specific loads, the conventional disk quickly breaks down and has to be frequently replaced. Replacement of a journal plain bearing is a labor-consuming procedure involving the disassembling of the crusher, dismantling and replacement of the bearing, and re-assembling of the machine.

Thus, the journal plain bearing is the most vulnerable element of the prior art design.

On the basis of the above, the object of the invention is improvement of the crusher by basically changing the design of the journal plain bearing, which must meet the following requirements.

The journal bearing should preferably have a significant contact area to reduce specific loads.

The journal bearing's contact area should preferably be arranged at an optimal distance from the center pivot to enable the use of advantages of the hydrodynamic sliding mode.

The journal bearing should preferably be a structure assembled from several components and enabling distribution of loads among the components, and have a significant thickness to increase the strength margin.

The journal bearing should preferably be arranged in such an area of the crusher where the required quantity of oil under the required pressure can easily be supplied.

To achieve these objects, it is proposed to change the location and design of the journal plain bearing in the known crusher design. It is proposed to arrange the journal bearing between the flange and the counterbalance weight. Also, instead of one disk of a certain radius, it is proposed to provide a journal bearing as two rings as assembled, having a much larger radius compared to the prior art and a special shape.

The objectives are achieved in an inertia cone crusher that includes a body, an outer cone, and an inner cone arranged inside it on a spherical support resting on a foundation over resilient dampers, which form a crushing chamber between them connected to the finished product discharge area, with an unbalance weight mounted on the inner cone's drive shaft with the aid of a slide bushing, the unbalance weight's center of gravity adjustable relative to the axis of rotation. The unbalance weight slide bushing is connected to a transmission disk coupling consisting of a driving half-coupling, a driven half-coupling, and a floating disk arranged between them. The transmission disk coupling is connected to the tooth gear and the counterbalance weight, which in turn are installed on the counterbalance weight bushing so that the tooth gear, counterbalance weight, and counterbalance weight bushing form a combined moving "dynamic assembly," the "dynamic assembly" is installed on a fixed pivot resting on the flange, and can rotate around the pivot via a journal plain bearing. The flange being rigidly fixed in the bottom part of the crusher body.

The inertia cone crusher has a journal plain bearing arranged between the flange and the counterbalance weight, and consists of a base ring resting on the flange and an upper ring supporting the counterbalance weight's slide bushing and the counterbalance weight itself; the base ring's inner radius being equal to the inner radius of the upper ring, equal to the inner radius of the unbalance weight bushing, and larger or equal to the outer radius of the fixed pivot; and the flange's top surface has a mating recess to install the base ring.

The exemplary inertia cone crusher may have the following additional features.

The plain bearing's base ring has a flat top surface and a spherical shape of the bottom surface, and the recess on the flange's top surface has a mating spherical shape to install the base ring.

The plain bearing's upper ring has a flat top surface and a flat bottom surface, with an annular shoulder along the upper outer edge.

On the bottom surface of the counterbalance weight, on the side of the larger segment of its disk, there is an annular groove meeting the upper ring's annular shoulder, and on the side of the smaller segment of the counterbalance weight disk, the disk's outer radius is designed equal or smaller than the inner radius of the shoulder.

The inner radius of the bearing's base ring is equal to the inner radius of the upper ring.

The outer radius of the plain bearing's base ring is equal to the outer radius of the upper ring.

The total thickness of the base ring and upper ring forming the plain bearing is such that there will always be a sufficient guaranteed clearance of the minimum height h between the moving counterbalance weight and the fixed flange.

Provided on the top surface of the base disk are radially arranged oil slots.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings:

FIG. 1 shows the diagram of a cone crusher as a cross-sectional view.

Figure 2:
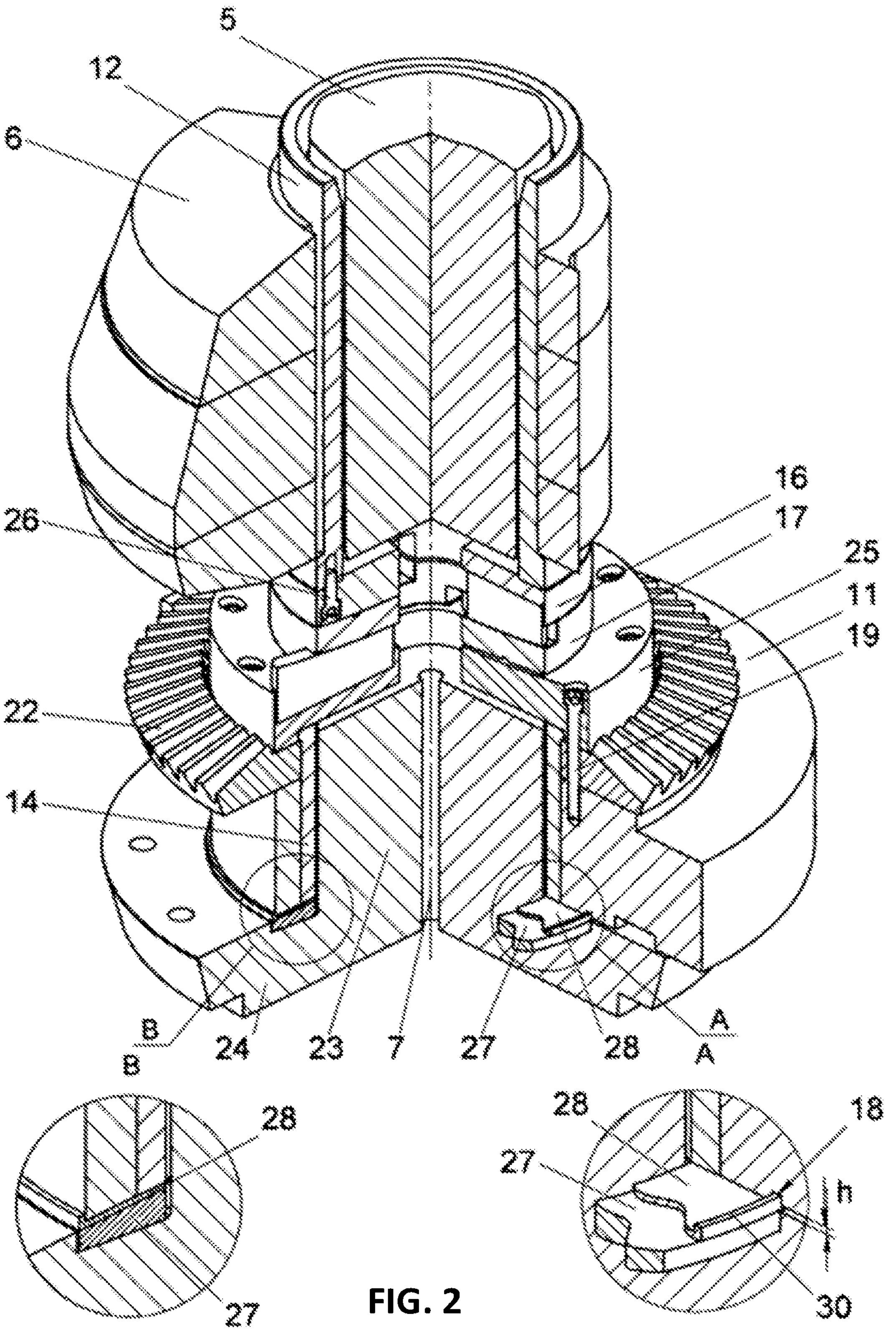

FIG. 2 presents a "dynamic assembly" and the crusher components coupled with it.

Figure 3:
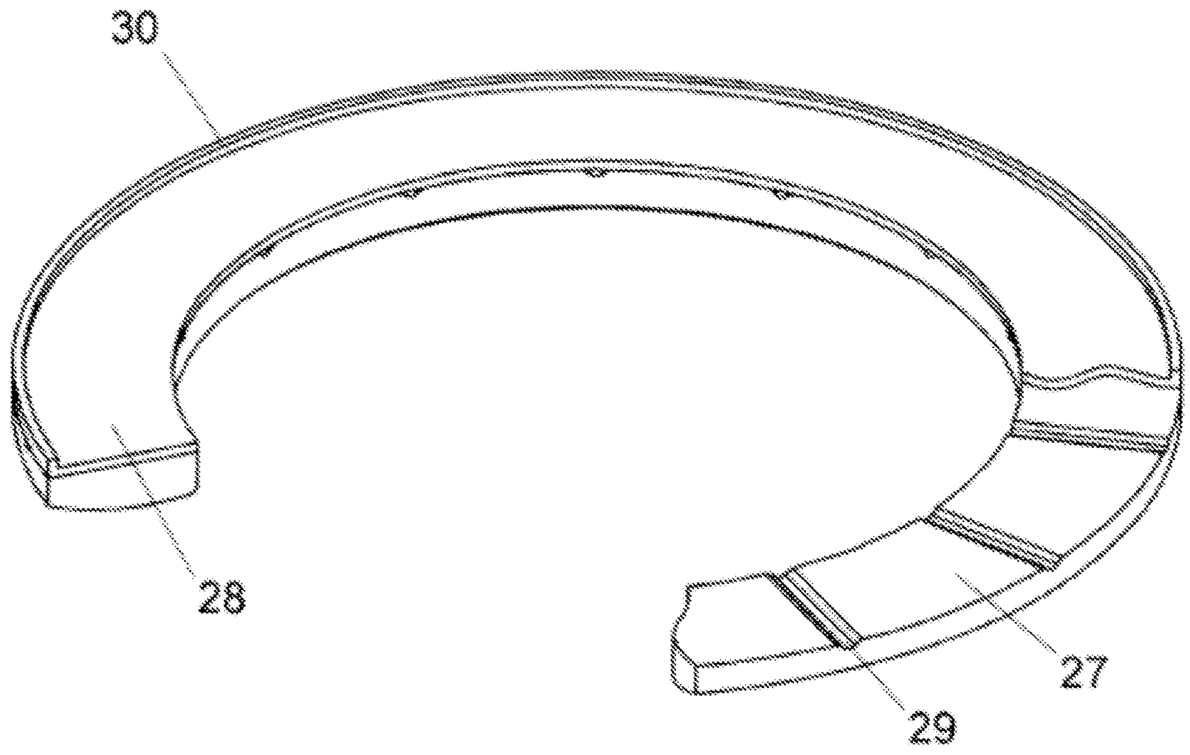

FIG. 3 presents a journal plain bearing as assembled.

DETAILED DESCRIPTION OF EMBODIMENTS OF THE INVENTION

Reference will now be made in detail to the preferred embodiments of the present invention, examples of which are illustrated in the accompanying drawings.

Body 1 of the cone crusher is mounted upon foundation 9 over resilient dampers 10. Outer crushing cone 2 and inner crushing cone 3, which is mounted upon head center 15, form a crushing chamber between them. Head center 15 rests on spherical support 4. Installed on shaft 5 of head center 15 are unbalance weight's slide bushing 12 and unbalance weight 6. The bushing is rigidly connected to transmission coupling 13, FIG. 1.

Transmission coupling 13 consists of driving half-coupling 25, driven half-coupling 16, and floating disk 17 arranged between them; the coupling design is shown in detail in FIG. 2.

Unbalance weight's slide bushing 12 has mounting holes along the rim edge, with the aid of which is its rigidly connected to driven half-coupling 16 via its mounting holes with mounting bolts 26.

Driving half-coupling 25 has mounting holes, via which it is rigidly connected with gear 22 via mounting holes along the edges of its central mounting hole and simultaneously with counterbalance weight 11 with mounting bolts 19.

Counterbalance weight 11 is shaped as a disk segment, at the center of which is a mounting hole equal to the outer radius of slide bushing 14. Along the edge of the central mounting hole of counterbalance weight 11 are fastening surfaces of the disk of counterbalance weight 11, with a recess provided to mate the mounting fasteners of flange 24.

Driving half-coupling 25, tooth gear 22 and counterbalance weight 11 are mounted upon counterbalance weight's slide bushing 14, forming one body of rotation with it.

Thus, driving half-coupling 25, gear 22, counterbalance weight 11, and slide bushing 14 form one moving "dynamic assembly," all of whose components are rigidly connected to each other.

The "dynamic assembly" is installed on fixed pivot 23 and flange 24 via journal plain bearing 27, 28 as assembled, enabling the assembly's rotation around pivot 23, for which purpose, slide bushing 14 is mounted on pivot 23.

A recess is provided on the bottom surface of driving half-coupling 25, whose outer radius is equal to the outer radius of bushing 14.

The journal plain bearing consists of upper ring 28 and base ring 27, see FIG. 3. Upper ring 28 has a flat top surface and a flat bottom surface, and annular shoulder 30 along the outer top edge.

On the bottom surface of counterbalance weight 11, on the side of the disk's larger segment, is annular groove 18 mating shoulder 30.

On the side of the smaller segment of the disk of counterbalance weight 11, the disk's outer radius is designed to be equal or smaller than the inner radius of shoulder 30.

Base ring 27 has a flat top surface and a spherical bottom surface. Flange 24 has a mating spherical recess on its top surface to install base ring 27, Note B, FIG. 2.

The radius of inner holes of base ring 27 and upper ring 28 are made equal. The outer radius of pivot 23 is made smaller than the plain bearing's inner radius by the size of the clearance necessary and sufficient for free rotation of the bearing around pivot 23.

Pivot 23 rests on flange 24 rigidly fixed in the bottom part of body 1 with mounting bolts.

Pivot 23 and flange 24 may be designed either as two different parts rigidly connected to each other or as one integral part acting as a fixed bearing support for the "dynamic assembly."

The moving "dynamic assembly" is installed so that unbalance weight 6 is always opposite in phase to counterbalance weight 11.

Thus, journal bearing 27, 28 as assembled is installed between the moving "dynamic assembly" and fixed flange 24, bearing the load of the entire "dynamic assembly," transmission assembly, and unbalance weight vibrator.

Counterbalance weight 11 is designed and arranged so as to provide its minimum clearances with body 1 and flange 24, enabling the maximum use of the body space without increasing its dimensions.

Tooth gear 22 is engaged with drive gear shaft 21 installed in body 20 of the gear shaft connected to a motor (not shown in the figures).

The invention works as follows.

The torque from the motor is transmitted to drive gear shaft 21 and to the tooth gear 22. Along with gear 22, the entire "dynamic assembly" is set into rotation, comprising also counterbalance weight slide bushing 14, counterbalance weight 11, and driving half-coupling 27 of transmission coupling 13. Thus, the "dynamic assembly" rotates around fixed pivot 23 and flange 24 resting on journal plain bearing 28, 27 as assembled.

The spherical shape of the bottom surface of base ring 27 and the spherical shape of its mating recess on the top surface of flange 24 serve the bearing self-adjustment and self-alignment in relation to the crusher's center axis of rotation 7 in the initial assembling of this assembly of the crusher.

Shoulder 30 of upper ring 28 serves to align the journal bearing in relation to counterbalance weight 11 and to the crusher's center axis of rotation 7.

Since all the moving parts rotate around a common axis, it is important that the axes of rotation of all moving parts of the "dynamic assembly" and the axis of rotation of journal plain bearing 27, 28 coincide with the crusher's central pivot.

The total thickness of the journal bearing 28, 27 as assembled is calculated so that there will always be a sufficient guaranteed clearance of the minimum height h between moving counterbalance weight 11 and fixed flange 24, as shown in Note A, FIG. 2.

Thus, parts 11 and 24 do not contact each other, therefore there is no friction between the parts.

Between pivot 23 and bushing 14 is a clearance necessary and sufficient for free rotation of bushing 14 and related "dynamic assembly" around pivot 23.

Oil under pressure is supplied via an oil duct 8 to the crusher's inner cavities. For additional lubrication of parts of journal bearing 27, 28, and especially for oil lubrication of the interface of the top surface of base ring 27 and bottom surface of upper ring 28, with radial oil slots 29 provided on the upper surface of base ring 27. Via the slots 29, oil goes from the friction cavity between pivot 23 and bushing 14 to the outer perimeter of the plain bearing.

The present design of journal plain bearing 28, 27 is intended to reduce specific loads occurring in the rotation of the "dynamic assembly" by increasing the contact area. Loads are also reduced by the oil wedge formed between the bearing's rings with oil supplied under pressure and distributed among radial slots. A favorable operating mode of the bearing is provided due to the generated "hydrodynamic sliding" mode.

The spherical bottom surface of the base ring enables using the self-adjustment, or self-alignment, effect in the assembling of the crusher structure.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention.

What is claimed is:

1. An inertia cone crusher comprising:

a body resting on a foundation over resilient dampers;

an outer cone and an inner cone arranged inside the body on a spherical support, the outer cone and the inner cone forming a crushing chamber in between, the crushing chamber being connected to a finished product discharge area, an unbalance weight mounted upon a drive shaft of the inner cone using an unbalance weight slide bushing, the unbalance weight having a center of gravity that is adjustable relative to an axis of rotation, the unbalance weight slide bushing being connected to a transmission disk coupling that includes a driving half-coupling, a driven half-coupling, and a floating disk arranged between them, the transmission disk coupling being connected to a tooth gear and a counterbalance weight, both being installed upon a counterbalance weight slide bushing, such that the tooth gear, the counterbalance weight, and the counterbalance weight slide bushing form a moving dynamic assembly, the dynamic assembly being mounted on a fixed pivot resting on a flange, and rotatable around the fixed pivot via a journal plain bearing, wherein the flange is rigidly fixed in a bottom part of the body;

wherein the journal plain bearing is arranged between the flange and the counterbalance weight, and includes a base ring resting on the flange and an upper ring supporting the counterbalance weight slide bushing and the counterbalance weight;

an inner radius of the base ring being equal to an inner radius of the upper ring and to an inner radius of the unbalance weight slide bushing, and being equal to or greater than the fixed pivot's outer radius; and a top surface of the flange has a mating recess for installing the base ring.

2. The crusher of claim 1, wherein the base ring has a flat top surface and a spherical bottom surface, and the mating recess has a spherical shape for coupling to the base ring.

3. The crusher of claim 1, wherein the upper ring has a flat top surface and a flat bottom surface, and an annular shoulder along a top outer edge.

4. The crusher of claim 3, further comprising an annular groove on a bottom surface of the counterbalance weight, on a side of a larger segment of its disk, that mates to the annular shoulder of the upper ring, and wherein, on a side of a smaller segment of the disk, its outer radius is equal to or smaller than an inner radius of the annular shoulder.

5. The crusher of claim 1, wherein an outer radius of the base ring is equal to an outer radius of the upper ring.

6. The crusher of claim 1, wherein a total thickness of the base ring and upper ring that together form the plain bearing is such that there will always be a sufficient guaranteed clearance of a predetermined minimum height between the counterbalance weight and the flange.

7. The crusher of claim 1, further comprising radially arranged oil slots on a top surface of the base ring.

8. An inertia cone crusher comprising:

a housing;

an outer cone and an inner cone arranged inside the housing on a support, the outer cone and the inner cone forming a crushing chamber, an unbalance weight mounted upon a drive shaft of the inner cone using an unbalance weight slide bushing, the unbalance weight having a center of gravity that is adjustable, the unbalance weight slide bushing being connected to a transmission disk coupling that includes a driving half-coupling, a driven half-coupling, and a floating disk arranged between them, the transmission disk coupling being connected to a gear and a counterbalance weight, both being installed upon a counterbalance weight slide bushing, such that the gear, the counterbalance weight, and the counterbalance weight slide bushing form a moving dynamic assembly, the dynamic assembly being rotatable around a fixed pivot via a bearing, wherein the bearing is arranged between a flange and the counterbalance weight, and includes a base ring resting on the flange and an upper ring supporting the counterbalance weight slide bushing and the counterbalance weight, and wherein an inner radius of the base ring being equal to an inner radius of the upper ring and to an inner radius of the unbalance weight slide bushing, and being equal to or greater than the fixed pivot's outer radius.

9. The inertia cone crusher of claim 8, wherein the support is spherical.

10. The inertia cone crusher of claim 8, wherein the crushing chamber is connected to a finished product discharge area.

11. The inertia cone crusher of claim 8, wherein the center of gravity is adjustable relative to an axis of rotation.

12. The inertia cone crusher of claim 8, wherein the gear is a tooth gear.

13. The inertia cone crusher of claim 8, wherein the dynamic assembly is mounted on a fixed pivot resting on the flange.

14. The inertia cone crusher of claim 8, wherein the bearing is a journal plain bearing.

15. The inertia cone crusher of claim 8, wherein the flange is rigidly fixed in a bottom of the housing.

16. The inertia cone crusher of claim 8, wherein a top surface of the flange has a mating recess for installing the base ring.

17. An inertia cone crusher comprising:

a housing;

an outer cone and an inner cone arranged inside the housing on a support, the outer cone and the inner cone forming a crushing chamber, an unbalance weight mounted upon a drive shaft of the inner cone using an unbalance bushing, the unbalance weight having an adjustable center of gravity, the unbalance bushing being connected to a transmission disk coupling that includes a driving half-coupling, a driven half-coupling, and a floating disk arranged between them, the transmission disk coupling being connected to a counterbalance weight, both being installed upon a counterbalance bushing, such that the counterbalance weight, and the counterbalance bushing are rotatable around a fixed pivot via a bearing, wherein the bearing includes a base ring resting on a flange and an upper ring supporting the counterbalance bushing and the counterbalance weight, and wherein an inner radius of the base ring is equal to an inner radius of the upper ring and to an inner radius of the unbalance bushing, and equal to or greater than the fixed pivot's outer radius.

* * * * *